United States Patent
Chen et al.

(10) Patent No.: US 12,455,298 B2
(45) Date of Patent: Oct. 28, 2025

(54) TEST SYSTEM FOR TESTING SEMICONDUCTOR DEVICES

(71) Applicant: TAIWAN MASK CORPORATION, Hsinchu County (TW)

(72) Inventors: Chih-Ming Chen, Hsinchu County (TW); Chih-Kang Toh, Hsinchu County (TW)

(73) Assignee: TAIWAN MASK CORPORATION, Hsinchu County (TW)

( * ) Notice: Subject to any disclaimer, the term of this patent is extended or adjusted under 35 U.S.C. 154(b) by 170 days.

(21) Appl. No.: 18/526,899

(22) Filed: Dec. 1, 2023

(65) Prior Publication Data

US 2024/0183878 A1 Jun. 6, 2024

Related U.S. Application Data

(60) Provisional application No. 63/429,295, filed on Dec. 1, 2022.

(30) Foreign Application Priority Data

Jul. 25, 2023 (TW) ................. 112127734

(51) Int. Cl.
  *G01R 31/28* (2006.01)
  *G01R 1/04* (2006.01)
(52) U.S. Cl.
  CPC ....... *G01R 1/0458* (2013.01); *G01R 31/2886* (2013.01)

(58) Field of Classification Search
  CPC .............. G01R 1/0466; G01R 1/07314; G01R 31/2879; G01R 31/2886; G01R 31/2889; G01R 31/2896
  See application file for complete search history.

(56) References Cited

U.S. PATENT DOCUMENTS 7,963,924 B2  6/2011  Rom
9,024,648 B2 * 5/2015  Horino ............... G01R 31/2893
                                                324/750.13

(Continued)

FOREIGN PATENT DOCUMENTS

TW    201042725 A   12/2010
TW    I582430 B     5/2017
TW    I624675 B     5/2018

*Primary Examiner* — Tung X Nguyen
(74) *Attorney, Agent, or Firm* — Muncy, Geissler, Olds & Lowe, P.C.

(57) ABSTRACT

A test system, for testing a plurality of semiconductor devices, includes a carrying apparatus, an abutting apparatus and a pressing apparatus including a cover and a seat. The cover and the seat constitute a test chamber and a sealed auxiliary chamber. The carrying apparatus is disposed within the test chamber. Each semiconductor device is carried by one of a plurality of test sockets of the carrying apparatus. The abutting apparatus is disposed between the cover and the test sockets. The auxiliary chamber is extracted through at least one extraction hole, such that an air pressure in the auxiliary chamber is lowered to actuate the cover toward the seat and further to apply force to the abutting apparatus, and such that the abutting apparatus presses against the test sockets and the semiconductor devices to allow each test socket to electrically contact with the semiconductor device carried by said one test socket.

10 Claims, 9 Drawing Sheets

(56) References Cited

U.S. PATENT DOCUMENTS

| | | | |
|---|---|---|---|
| 10,726,183 B1 | 7/2020 | Tsai et al. | |
| 2021/0302468 A1* | 9/2021 | Oh | G01R 31/27 |
| 2023/0069125 A1* | 3/2023 | Lee | G01R 31/2887 |

* cited by examiner

TEST SYSTEM FOR TESTING SEMICONDUCTOR DEVICES

CROSS-REFERENCE TO RELATED APPLICATION

This application claims the priority benefits of U.S. provisional application No. 63/429,295, filed on Dec. 1, 2022 and Taiwan application serial no. 112127734, filed on Jul. 25, 2023. The entirety of each of the above-mentioned patent applications is hereby incorporated by reference herein and made a part of this specification.

BACKGROUND OF THE INVENTION

1. Field of the Invention

The invention relates to a test system for testing semiconductor devices, and more in particular, to a test system for testing semiconductor devices by applying force to the semiconductor device and the test sockets to make excellent electrical contact between the semiconductor devices and the test sockets.

2. Description of the Prior Art

Current testing of semiconductor devices is performed by using a test system. The test system of a prior art for testing semiconductor devices includes a plurality of test sockets electrically bonded to at least one circuit board. Each of a plurality of semiconductor devices in a batch is respectively carried by one test socket. The test system of the prior art also includes an abutting apparatus and is equipped with a large mechanical power system applying a force to the abutting apparatus such that the abutting apparatus is pressed down on the plurality of semiconductor devices and the plurality of test sockets to allow the plurality of semiconductor devices and the plurality of test sockets to make electrical contact. This will not lead to the problem of incorrect testing.

Regarding the prior arts of the test system for testing semiconductor devices by using a mechanical power system, a number of solutions are focused on improving the height, pressure, flatness and so on of the contact between the abutting apparatus and the semiconductor devices. Some of the prior arts of the test system for testing semiconductor devices by using a mechanical power system utilize springs of specific strengths for this purpose. For example, Taiwan patent publication no. 201042725 discloses that horizontal holes are used to limit the compression force of the abutting apparatus in order to position the abutting apparatus. However, the horizontal holes disclosed in Taiwan patent publication no. 201042725 also limit flatness and pressure cushioning of the contact between the abutting apparatus and the semiconductor devices. In addition, U.S. Pat. No. 7,963,924 discloses that pins of different lengths are used in the abutting apparatus to adjust or limit the compression force of the abutting apparatus to position the abutting apparatus. However, the structure of the abutting apparatus disclosed in U.S. patent publication no. 7963924 is very complex and the pins are difficult to be replaced.

In addition, some of the prior arts of the test system for testing semiconductor devices by using a mechanical power system do not utilize springs but instead used mechanical structures to apply pressure. For example, Taiwan patent no. 1624675 uses a dual motor with a screw to vary the stroke of the abutting apparatuses.

However, each of the abutting apparatuses disclosed in Taiwan patent issued no. 1624675 cannot be adjusted independently and does not have a cushion design. In addition, In addition, Taiwan patent issued no. 1582430 discloses that the lever equipped with multiple ratchets with different diameters is used to enable the abutting apparatus to adjust its stroke. However, the abutting apparatus disclosed in Taiwan patent issued no. 1582430 has limited its stroke adjustment and no cushioning design. Furthermore, it should be emphasized that the above prior arts of the test system for testing semiconductor devices by using a mechanical power system require a huge motor or other gravity member installed on the top of the test chamber to achieve downward pressure by gravity applied on the abutting apparatus. Obviously, the mechanical power system used in the above prior arts takes up a lot of space, is more costly, and consumes more energy.

There is a test system of a prior art for testing semiconductor devices which utilizes vacuum technology to apply pressure to a counterpressure apparatus without the need of a large mechanical power system.

For example, Taiwan patent issued no. 1701438 discloses that a carrying apparatus including a plurality of test sockets, a plurality of semiconductor devices, and an abutting apparatus are placed within a sealed test chamber, and the test chamber is extracted to a negative pressure to cause the cover of the test chamber to move and further to apply a force on the abutting apparatus, so as to allow the plurality of semiconductor devices to make electrical contact with the plurality of test sockets. However, Taiwan patent issued no. 1701438 discloses that the cover and the circuit board must also be equipped with screws, connectors, pin joints, pipes and other devices and members, such that the devices and members inside the test chamber can be electrically connected to and communicate with the exterior of the test chamber. As the test system disclosed in Taiwan patent issued no. 1701438 is used over time, the devices and members mounted on the cover and the circuit board could become loose or deformed, resulting in vacuum leakage when the test chamber is extracted. Furthermore, the abutting apparatus of the mentioned-above prior art, like the abutting apparatus of a typical test system, therein has a flow passage for the flow of liquid for heat exchange with the semiconductor devices. As the test system of the mentioned-above prior art tests the semiconductor devices at high and low temperatures for a number of times, the sealing devices that allows the test chamber to achieve a seal may deteriorate and deform, resulting in vacuum leakage when the test chamber is extracted.

SUMMARY OF THE INVENTION

Accordingly, one scope of the invention is to provide a test system for testing semiconductor devices. The test system for testing semiconductor devices according to the invention does not utilize a mechanical power system and is capable of applying force to the semiconductor devices and the test sockets such that the semiconductor devices and the test sockets make excellent electrical contact.

A test system according to a first preferred embodiment of the invention is for test a plurality of semiconductor devices, and includes a pressing apparatus, a carrying apparatus and an abutting apparatus. The pressing apparatus includes a cover, a seat, a first sealing device, and a second sealing device. The cover includes a base plate, an enclosed outer rib wall and an enclosed inner rib wall. The base plate has a bottom surface. The enclosed outer rib wall and the enclosed inner rib wall are formed on the bottom surface of the base plate. The seat has an upper surface and a lower surface, and includes an enclosed outer sealing groove and an enclosed inner sealing groove. The enclosed outer sealing groove and the enclosed inner sealing groove are formed on the upper surface of the seat. The enclosed outer sealing groove is configured to receive a first distal end of the enclosed outer rib wall. The enclosed inner sealing groove is configured to receive a second distal end of the enclosed inner rib wall. The first sealing device is mounted on the enclosed outer rib wall near the first distal end. The second sealing device is mounted on the enclosed inner rib wall near the second distal end. When the first distal end of the enclosed outer rib wall is inserted into the enclosed outer sealing groove and the second distal end of the enclosed inner rib wall is inserted into the enclosed inner sealing groove, the base plate, the enclosed inner rib wall and the seat constitutes a test chamber. The test chamber has at least one vent. The test chamber communicates with an exterior of the test system according to the first preferred embodiment of the invention through the at least one vent. The first sealing device is pressed between the enclosed outer rib wall and the enclosed outer sealing groove. The base plate, the enclosed outer rib wall, the enclosed inner rib wall and the seat constitutes a sealed auxiliary chamber. The auxiliary chamber has at least one extraction hole. The second sealing device is pressed between the enclosed inner rib wall and the enclosed inner sealing groove. The carrying apparatus is disposed within the test chamber. The carrying apparatus includes at least one circuit board and a plurality of test sockets. The at least one circuit board is disposed on the upper surface of the seat. Each test socket corresponds to one of the at least one circuit board, and is electrically connected to the corresponding circuit board. Each semiconductor device is carried by one of the test sockets. The abutting apparatus is disposed between the bottom surface of the cover and the plurality of test sockets. The auxiliary chamber is extracted through the at least one extraction hole, such that an air pressure in the auxiliary chamber is lowered to actuate the cover toward the seat and further to apply a force to the abutting apparatus, and such that the abutting apparatus presses against the plurality of semiconductor devices and the plurality of test sockets to allow each test socket to electrically contact with the semiconductor device carried by said one test socket.

Further, the carrying apparatus also includes at least one electrical connection unit. Each electrical connection unit corresponds to one of the at least one circuit board, and is electrically connected to the corresponding circuit board. Each electrical connection unit passes through the seat.

Further, the cover also includes a plurality of sub-rib walls. The sub-rib walls are formed on the bottom surface of the base plate, and are connected to the outer rib wall and the inner rib wall. The seat also includes a plurality of sub-sealing grooves. The sub-sealing grooves are formed on the upper surface of the seat. Each sub-sealing groove corresponds to one of the sub-rib walls, and is configured to receive a respective third distal end of the corresponding sub-rib wall. The pressing apparatus also includes a plurality of third sealing devices. Each third sealing device corresponds to one of the sub-rib walls, and is mounted on the corresponding sub-rib wall near the third distal end. The sealed auxiliary chamber are separated by the plurality of sub-rib walls into a plurality of sealed auxiliary sub-chambers. The plurality of auxiliary sub-chambers are respectively extracted through the at least one vent.

Further, the pressing apparatus also includes a fourth sealing device and a fifth sealing device. The fourth sealing device is mounted on the first distal end of the enclosed outer rib wall. The fifth sealing device is mounted on the second distal end of the enclosed inner rib wall.

In one embodiment, the enclosed outer sealing groove and the enclosed inner sealing groove extend upwardly from the upper surface of the seat.

In another embodiment, the enclosed outer sealing groove and the enclosed inner sealing groove are recessed downwardly from the upper surface of the seat.

A test system according to a second preferred embodiment of the invention is for test a plurality of semiconductor devices, and includes a pressing apparatus, a carrying apparatus and an abutting apparatus. The pressing apparatus includes a cover, a seat, a first sealing device, and a second sealing device. The cover includes a base plate, an enclosed outer rib wall and an enclosed inner rib wall. The base plate has a bottom surface. The enclosed outer rib wall and the enclosed inner rib wall are formed on the bottom surface of the base plate. The seat has an upper surface and a lower surface, and includes an enclosed outer sealing groove and an enclosed inner sealing groove. The enclosed outer sealing groove and the enclosed inner sealing groove are formed on the upper surface of the seat. The enclosed outer sealing groove is configured to receive a first distal end of the enclosed outer rib wall. The enclosed inner sealing groove is configured to receive a second distal end of the enclosed inner rib wall. The first sealing device is mounted on the enclosed outer rib wall near the first distal end. The second sealing device is mounted on the enclosed inner rib wall near the second distal end. When the first distal end of the enclosed outer rib wall is inserted into the enclosed outer sealing groove and the second distal end of the enclosed inner rib wall is inserted into the enclosed inner sealing groove, the base plate, the enclosed inner rib wall and the seat constitute a sealed auxiliary chamber. The auxiliary chamber has at least one extraction hole. The first sealing device is pressed between the enclosed outer rib wall and the enclosed outer sealing groove. The base plate, the enclosed outer rib wall, the enclosed inner rib wall and the seat constitute a test chamber. The test chamber has at least one vent. The test chamber communicates with an exterior of the test system according to the second preferred embodiment of the invention through the at least one vent. The second sealing device is pressed between the enclosed inner rib wall and the enclosed inner sealing groove. The carrying apparatus is disposed within the test chamber. The carrying apparatus includes at least one circuit board and a plurality of test sockets. The at least one circuit board is disposed on the upper surface of the seat. Each test socket corresponds to one of the at least one circuit board, and is electrically connected to the corresponding circuit board. Each semiconductor device is carried by one of the test sockets. The abutting apparatus is disposed between the bottom surface of the cover and the test sockets. The auxiliary chamber is extracted through the at least one extraction hole, such that an air pressure in the auxiliary chamber is lowered to actuate the cover toward the seat and further to apply a force to the abutting apparatus, and such that the abutting apparatus presses against the plurality of semiconductor devices and the plurality of test sockets to allow each test socket to electrically contact with the semiconductor device carried by said one test socket.

Different from the prior art, the test system for testing semiconductor devices according to the invention does not utilize a mechanical power system. The test system according to the invention has a test chamber that is not sealed and is not extracted. The test system according to the invention has a sealed auxiliary chamber which is extracted to apply a force to the abutting apparatus such that the abutting apparatus presses against the plurality of semiconductor devices and the plurality of test sockets to allow each test socket to electrically contact with the semiconductor device carried by said one test socket.

The advantage and spirit of the invention may be understood by the following recitations together with the appended drawings.

DETAILED DESCRIPTION OF THE INVENTION

Some preferred embodiments and practical applications of this present invention would be explained in the following paragraph, describing the characteristics, spirit, and advantages of the invention.

Figure 1:
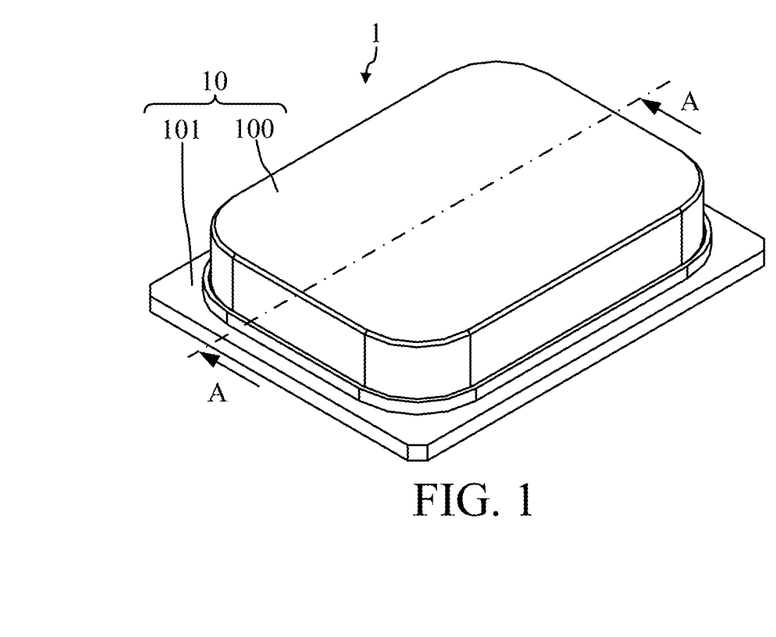
FIG. 1 is a perspective view of a test system according to the first preferred embodiment of the invention.
Figure 2:
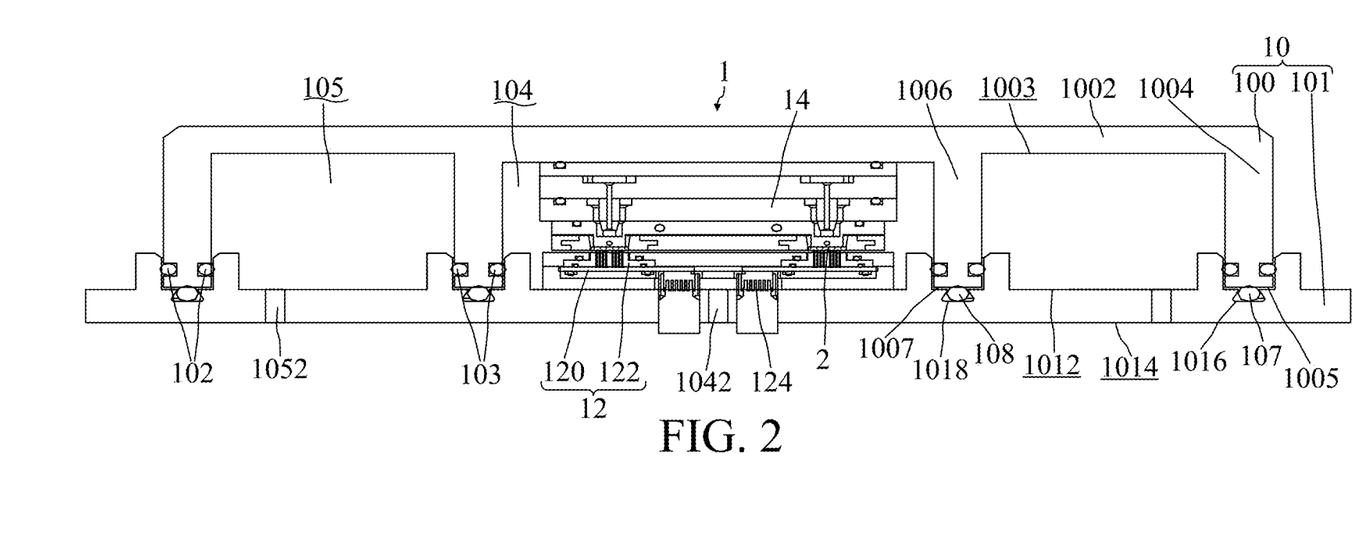
FIG. 2 is a cross-sectional view taken along line A-A of the test system shown in FIG. 1.
Figure 3:
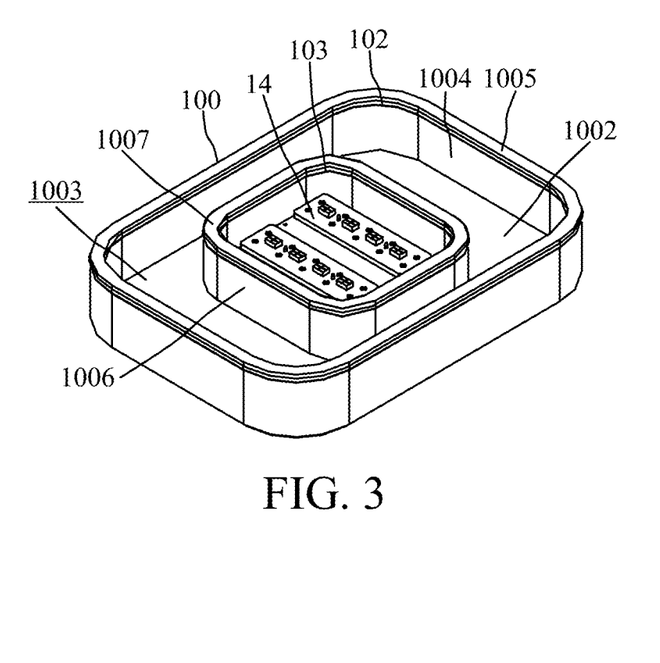
FIG. 3 is a perspective view of another perspective of the essential device and members of the test system according to the first preferred embodiment of the invention—a cover and an abutting apparatus.
Figure 4:
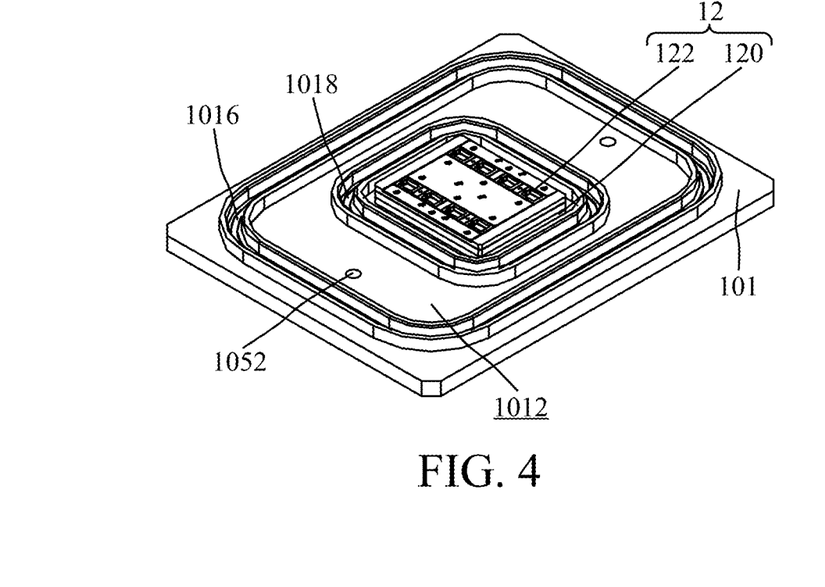
FIG. 4 is a perspective view of the essential device and members of the test system according to the first preferred embodiment of the invention—a seat and a carrying apparatus.

Referring to FIG. 1, FIG. 2, FIG. 3 and FIG. 4, those drawings schematically show a test system 1 according to the first preferred embodiment of the invention. FIG. 2 is a cross-sectional view taken along line A-A of the test system 1 shown in FIG. 1. FIG. 3 is a perspective view of another perspective of the essential device and members of the test system 1 according to the first preferred embodiment of the invention—a cover 100 and an abutting apparatus 14. FIG. 4 is a perspective view of the essential device and members of the test system 1 according to the first preferred embodiment of the invention—a seat 101 and a carrying apparatus 12.

As shown in FIG. 1, FIG. 2, FIG. 3 and FIG. 4, the test system 1 according to a first preferred embodiment of the invention is for test a plurality of semiconductor devices 2, and includes a pressing apparatus 10, a carrying apparatus 12 and an abutting apparatus 14.

The pressing apparatus 10 includes a cover 100, a seat 101, a first sealing device 102, and a second sealing device 103. The cover 100 includes a base plate 1002, an enclosed outer rib wall 1004 and an enclosed inner rib wall 1006. The base plate 1002 has a bottom surface 1003. The enclosed outer rib wall 1004 and the enclosed inner rib wall 1006 are formed on the bottom surface 1003 of the base plate 1002. The seat 101 has an upper surface 1012 and a lower surface 1014, and includes an enclosed outer sealing groove 1016 and an enclosed inner sealing groove 1018. The enclosed outer sealing groove 1016 and the enclosed inner sealing groove 1018 are formed on the upper surface 1012 of the seat 101. The enclosed outer sealing groove 1016 is configured to receive a first distal end 1005 of the enclosed outer rib wall 1004. The enclosed inner sealing groove 1018 is configured to receive a second distal end 1007 of the enclosed inner rib wall 1006. The first sealing device 102 is mounted on the enclosed outer rib wall 1004 near the first distal end 1005. The second sealing device 103 is mounted on the enclosed inner rib wall 1006 near the second distal end 1007.

When the first distal end 1005 of the enclosed outer rib wall 1004 is inserted into the enclosed outer sealing groove 1016 and the second distal end 1007 of the enclosed inner rib wall 1006 is inserted into the enclosed inner sealing groove 1018, the base plate 1002, the enclosed inner rib wall 1006 and the seat 101 constitutes a test chamber 104. The test chamber 104 has at least one vent 1042. In the example shown in FIG. 2, the at least one vent 1042 is formed on the seat 101. The at least one vent 1042 may also be formed on the base plate 1002 or elsewhere on the test chamber 104. The test chamber 104 communicates with an exterior of the test system 1 according to the first preferred embodiment of the invention through the at least one vent 1042. The first sealing device 102 is pressed between the enclosed outer rib wall 1004 and the enclosed outer sealing groove 1016. The base plate 1002, the enclosed outer rib wall 1004, the enclosed inner rib wall 1006 and the seat 101 constitutes a sealed auxiliary chamber 105. The auxiliary chamber 105 has at least one extraction hole 1052. The second sealing device 103 is pressed between the enclosed inner rib wall 1006 and the enclosed inner sealing groove 1018. In the example shown in FIG. 2, the at least one extraction hole 1052 is formed on the seat 101. The at least one extraction hole 1052 may also be formed on the base plate 1002 or elsewhere on the auxiliary chamber 105.

The carrying apparatus 12 is disposed within the test chamber 104. The carrying apparatus 12 includes at least one circuit board 120 and a plurality of test sockets 122. The at least one circuit board 120 is disposed on the upper surface 1012 of the seat 101. Each test socket 122 corresponds to one of the at least one circuit board 120, and is electrically connected to the corresponding circuit board 120. Each semiconductor device 2 is carried by one of the test sockets 122. The abutting apparatus 14 is disposed between the bottom surface 1003 of the cover 100 and the plurality of test sockets 122. In one embodiment, each test socket 122 is equipped with a plurality of micro-spring probes, cantilever probes, cobra probes, wire probes, contact probes, or other types of probes, but the invention is not limited thereto.

The auxiliary chamber 105 is extracted through the at least one extraction hole 1052, such that an air pressure in the auxiliary chamber 105 is lowered to actuate the cover 100 toward the seat 101 and further to apply a force to the abutting apparatus 14, and such that the abutting apparatus 14 presses against the plurality of semiconductor devices 2 and the plurality of test sockets 122 to allow each test socket 122 to electrically contact with the semiconductor device 2 carried by said one test socket 122.

Further, also shown in FIG. 2, the carrying apparatus 12 also includes at least one electrical connection unit 124. Each electrical connection unit 124 corresponds to one of the at least one circuit board 120, and is electrically connected to the corresponding circuit board 120. Each electrical connection unit 124 passes through the seat 101.

Figure 5:
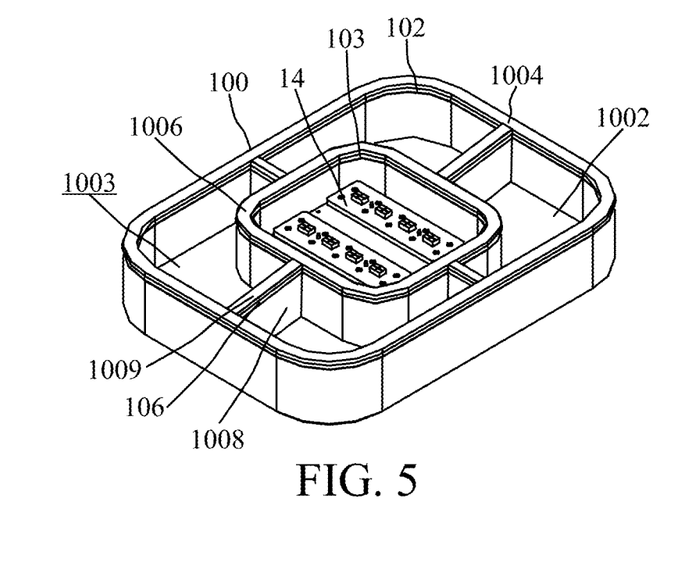
FIG. 5 is a perspective view of another perspective of the essential device and members of the test system according to a modification of the first preferred embodiment of the invention the essential device and members— a cover and an abutting apparatus.
Figure 6:
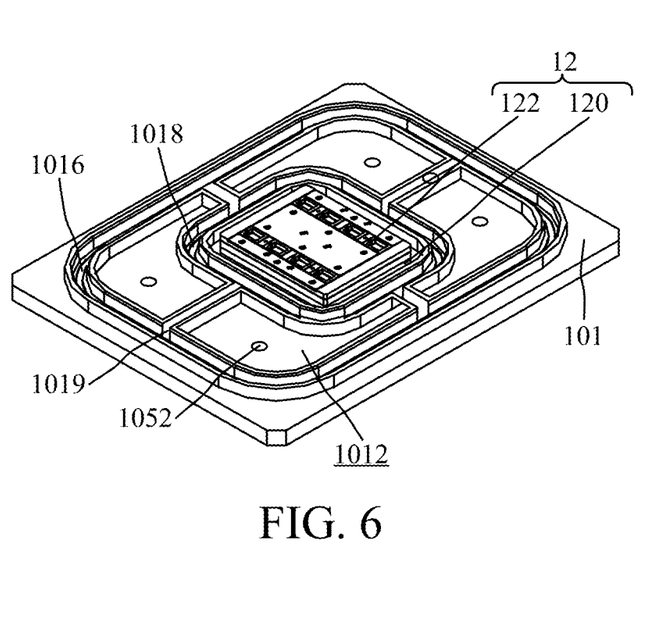
FIG. 6 is a perspective view of the essential device and members of the test system according to the modification of the first preferred embodiment of the invention the essential device and members— a seat and a carrying apparatus.

Referring to FIG. 5 and FIG. 6, those drawings schematically show the test system 1 according to a modification of the first preferred embodiment of the invention. FIG. 5 is a perspective view of another perspective of the essential device and members of the test system 1 according to the modification of the first preferred embodiment of the invention the essential device and members— the cover 100 and the abutting apparatus 14. FIG. 6 is a perspective view of the essential device and members of the test system 1 according to the modification of the first preferred embodiment of the invention the essential device and members— the seat 101 and the carrying apparatus 12.

According to the modification of the first preferred embodiment of the invention, as shown in FIG. 5 and FIG. 6, further, the cover 100 also includes a plurality of sub-rib walls 1008. The sub-rib walls 1008 are formed on the bottom surface 1003 of the base plate 1002, and are connected to the outer rib wall 1004 and the inner rib wall 1006. The seat 101 also includes a plurality of sub-sealing grooves 1019. The sub-sealing grooves 1019 are formed on the upper surface 1012 of the seat 101. Each sub-sealing groove 1019 corresponds to one of the sub-rib walls 1008, and is configured to receive a respective third distal end 1009 of the corresponding sub-rib wall 1008. The pressing apparatus 10 also includes a plurality of third sealing devices 106. Each third sealing device 106 corresponds to one of the sub-rib walls 1008, and is mounted on the corresponding sub-rib wall 1008 near the third distal end 1009. The sealed auxiliary chamber 105 shown in FIG. 2 are separated by the plurality of sub-rib walls 1008 into a plurality of sealed auxiliary sub-chambers (not notated in FIG. 5 and FIG. 6). The plurality of auxiliary sub-chambers are respectively extracted through the at least one vent 1042.

Thereby, if after a period of use of the abutting apparatus 14, there is a discrepancy in the pressure of different parts of the abutting apparatus 14 against the plurality of test sockets 122 and the plurality of semiconductor devices 2 resulting in an uneven force between the plurality of semiconductor devices 2 and the plurality of test sockets 122, the problem can be solved by allowing individual auxiliary sub-chamber to be extracted to different degrees.

Further, also shown in FIG. 2, the pressing apparatus 10 also includes a fourth sealing device 107 and a fifth sealing device 108. The fourth sealing device 107 is mounted on the first distal end 1005 of the enclosed outer rib wall 1004. The fifth sealing device 108 is mounted on the second distal end 1007 of the enclosed inner rib wall 1006.

In one embodiment, the enclosed outer sealing groove 1016 and the enclosed inner sealing groove 1018 extend upwardly from the upper surface 1012 of the seat 101, as shown in FIG. 2 and FIG. 4.

In another embodiment, the enclosed outer sealing groove 1016 and the enclosed inner sealing groove 1018 are recessed downwardly from the upper surface 1012 of the seat 101.

Figure 7:
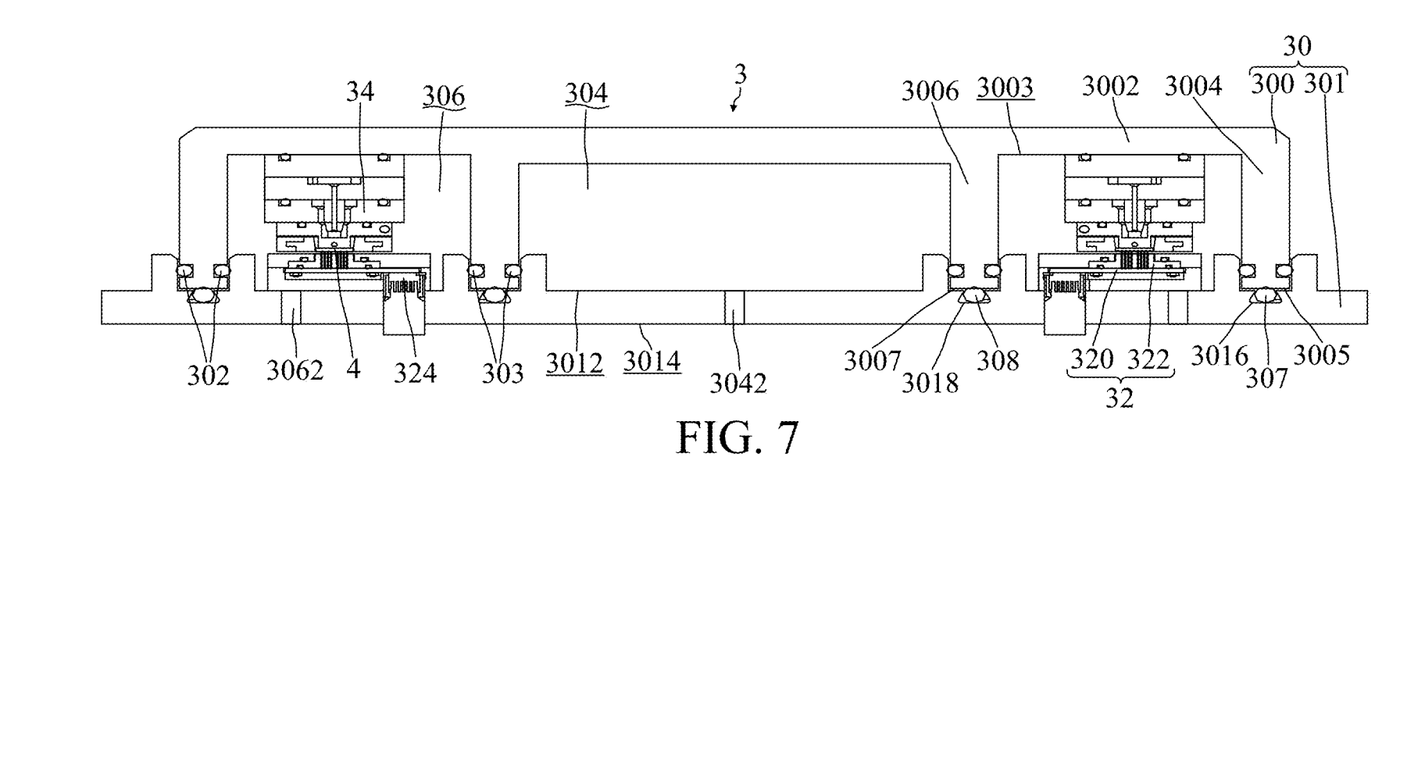
FIG. 7 is cross-sectional view of a test system according to the second preferred embodiment of the invention.
Figure 8:
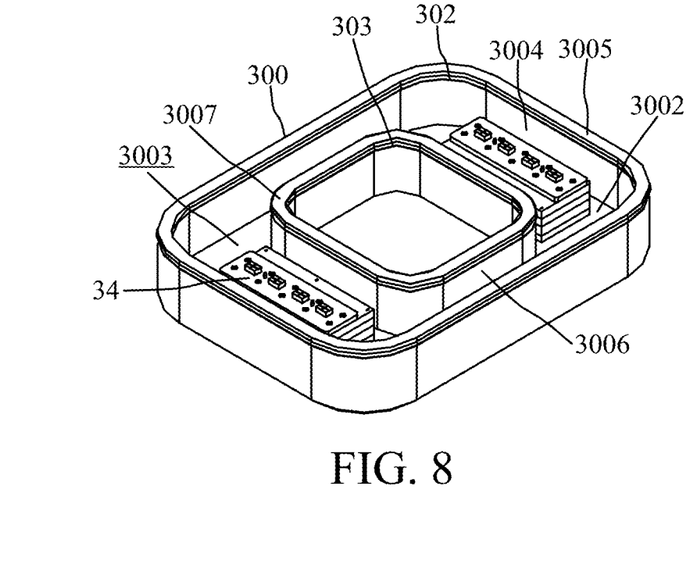
FIG. 8 is a perspective view of another perspective of the essential device and members of the test system according to the second preferred embodiment of the invention—a cover and an abutting apparatus.
Figure 9:
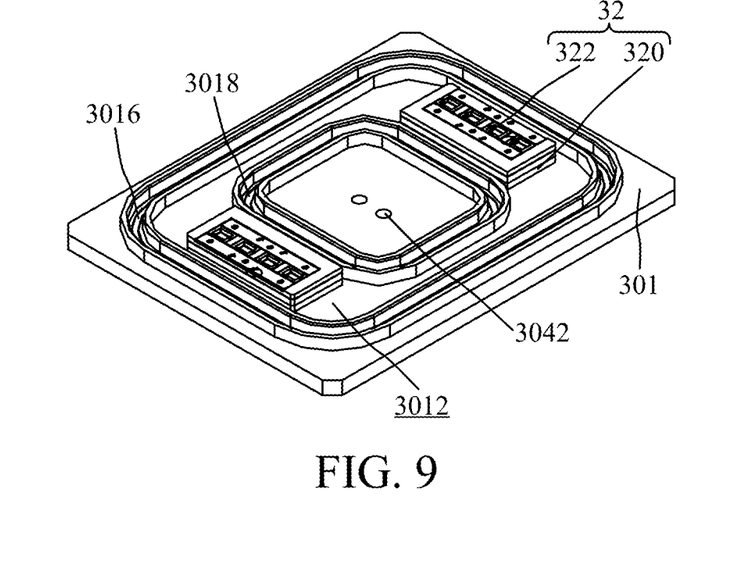
FIG. 9 is a perspective view of the essential device and members of the test system according to the second preferred embodiment of the invention—a seat and a carrying apparatus.

Referring to FIG. 7, FIG. 8 and FIG. 9, those drawings schematically show a test system 3 according to the first preferred embodiment of the invention. FIG. 7 is cross-sectional view of the test system 3 according to the second preferred embodiment of the invention. FIG. 8 is a perspective view of another perspective of the essential device and members of the test system 3 according to the second preferred embodiment of the invention—a cover 300 and an abutting apparatus 34. FIG. 9 is a perspective view of the essential device and members of the test system 3 according to the second preferred embodiment of the invention—a seat a301 and a carrying apparatus 32.

As shown in FIG. 7, FIG. 8 and FIG. 9, the test system 3 according to a second preferred embodiment of the invention is for test a plurality of semiconductor devices 4, and includes a pressing apparatus 30, a carrying apparatus 32 and an abutting apparatus 34.

The pressing apparatus 30 includes a cover 300, a seat 301, a first sealing device 302, and a second sealing device 303. The cover 300 includes a base plate 3002, an enclosed outer rib wall 3004 and an enclosed inner rib wall 3006. The base plate 3002 has a bottom surface 3003. The enclosed outer rib wall 3004 and the enclosed inner rib wall 3006 are formed on the bottom surface 3003 of the base plate 3002. The seat 301 has an upper surface 3012 and a lower surface 3014, and includes an enclosed outer sealing groove 3016 and an enclosed inner sealing groove 3018. The enclosed outer sealing groove 3016 and the enclosed inner sealing groove 3018 are formed on the upper surface 3012 of the seat 301. The enclosed outer sealing groove 3016 is configured to receive a first distal end 3005 of the enclosed outer rib wall 3004. The enclosed inner sealing groove 3018 is configured to receive a second distal end 3007 of the enclosed inner rib wall 3006. The first sealing device 302 is mounted on the enclosed outer rib wall 3004 near the first distal end 3005. The second sealing device 303 is mounted on the enclosed inner rib wall 3006 near the second distal end 3007.

When the first distal end 3005 of the enclosed outer rib wall 3004 is inserted into the enclosed outer sealing groove 3016 and the second distal end 3007 of the enclosed inner rib wall 3006 is inserted into the enclosed inner sealing groove 3018, the base plate 3002, the enclosed inner rib wall 3006 and the seat 301 constitute a sealed auxiliary chamber 304. The auxiliary chamber 304 has at least one extraction hole 3042. In the example shown in FIG. 7, the at least one extraction hole 3042 is formed on the seat 301. The at least one extraction hole 3042 may also be formed on the base plate 3002 or elsewhere on the auxiliary chamber 304. The first sealing device 302 is pressed between the enclosed outer rib wall 3004 and the enclosed outer sealing groove 3016. The base plate 3002, the enclosed outer rib wall 3004, the enclosed inner rib wall 3006 and the seat 301 constitute a test chamber 306. The test chamber 306 has at least one vent 3062. In the example shown in FIG. 7, the at least one vent 3062 is formed on the seat 301. The at least one vent 3062 may also be formed on the base plate 3002 or elsewhere on the test chamber 306. The test chamber 306 communicates with an exterior of the test system 3 according to the second preferred embodiment of the invention through the at least one vent 3062. The second sealing device 303 is pressed between the enclosed inner rib wall 3006 and the enclosed inner sealing groove 3018.

The carrying apparatus 32 is disposed within the test chamber 306. The carrying apparatus 32 includes at least one circuit board 320 and a plurality of test sockets 322. The at least one circuit board 320 is disposed on the upper surface 3012 of the seat 301. Each test socket 322 corresponds to one of the at least one circuit board 320, and is electrically connected to the corresponding circuit board 320. Each semiconductor device 4 is carried by one of the test sockets 322. The abutting apparatus 34 is disposed between the bottom surface 3003 of the cover 300 and the test sockets 322.

The auxiliary chamber 304 is extracted through the at least one extraction hole 3042, such that an air pressure in the auxiliary chamber 304 is lowered to actuate the cover 300 toward the seat 301 and further to apply a force to the abutting apparatus 34, and such that the abutting apparatus 34 presses against the plurality of semiconductor devices 4 and the plurality of test sockets 322 to allow each test socket 322 to electrically contact with the semiconductor device 4 carried by said one test socket 322.

Further, also as shown in FIG. 7, the carrying apparatus 32 also includes at least one electrical connection unit 324. Each electrical connection unit 324 corresponds to one of the at least one circuit board 320, and is electrically connected to the corresponding circuit board 320. Each electrical connection unit 324 passes through the seat 301.

Further, also as shown in FIG. 7, the pressing apparatus 30 also includes a third sealing device 307 and a fourth sealing device 308. The third sealing device 307 is mounted on the first distal end 3005 of the enclosed outer rib wall 3004. The fourth sealing device 308 is mounted on the second distal end 3007 of the enclosed inner rib wall 3006.

In one embodiment, the enclosed outer sealing groove 3016 and the enclosed inner sealing groove 3018 extend upwardly from the upper surface 3012 of the seat 301, as shown in FIG. 7.

In another embodiment, the enclosed outer sealing groove 3016 and the enclosed inner sealing groove 3018 are recessed downwardly from the upper surface 3012 of the seat 301.

With the detailed description of the above preferred embodiments of the invention, it is clear to understand that, the test system for testing semiconductor devices according to the invention does not utilize a mechanical power system. The test system according to the invention has a test chamber that is not sealed and is not extracted. The test system according to the invention has a sealed auxiliary chamber which is extracted to apply a force to the abutting apparatus such that the abutting apparatus presses against the plurality of semiconductor devices and the plurality of test sockets to allow each test socket to electrically contact with the semiconductor device carried by said one test socket.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A test system for testing a plurality of semiconductor devices, comprising:
a pressing apparatus, comprising:
a cover, comprising a base plate, an enclosed outer rib wall and an enclosed inner rib wall, the base plate having a bottom surface, the enclosed outer rib wall and the enclosed inner rib wall being formed on the bottom surface of the base plate;
a seat, having an upper surface and comprising an enclosed outer sealing groove and an enclosed inner sealing groove, the enclosed outer sealing groove and the enclosed inner sealing groove being formed on the upper surface of the seat, the enclosed outer sealing groove being configured to receive a first distal end of the enclosed outer rib wall, the enclosed inner sealing groove being configured to receive a second distal end of the enclosed inner rib wall;
a first sealing device, mounted on the enclosed outer rib wall near the first distal end; and
a second sealing device, mounted on the enclosed inner rib wall near the second distal end, when the first distal end of the enclosed outer rib wall is inserted into the enclosed outer sealing groove and the second distal end of the enclosed inner rib wall is inserted into the enclosed inner sealing groove, the base plate, the enclosed inner rib wall and the seat constituting a test chamber, the test chamber having at least one vent, the test chamber communicating with an exterior of said test system through the at least one vent, the first sealing device is pressed between the enclosed outer rib wall and the enclosed outer sealing groove, the base plate, the enclosed outer rib wall, the enclosed inner rib wall and the seat constituting a sealed auxiliary chamber, the auxiliary chamber having at least one extraction hole, the second sealing device being pressed between the enclosed inner rib wall and the enclosed inner sealing groove;
a carrying apparatus, disposed within the test chamber, the carrying apparatus comprising:
at least one circuit board, disposed on the upper surface of the seat; and
a plurality of test sockets, each test socket corresponding to one of the at least one circuit board and being electrically connected to the corresponding circuit board, each semiconductor device being carried by one of the test sockets; and
an abutting apparatus, disposed between the bottom surface of the cover and the test sockets,
wherein the auxiliary chamber is extracted through the at least one extraction hole, such that an air pressure in the auxiliary chamber is lowered to actuate the cover toward the seat and further to apply a force to the abutting apparatus, and such that the abutting apparatus presses against the plurality of semiconductor devices and the plurality of test sockets to allow each test socket to electrically contact with the semiconductor device carried by said one test socket.

2. The test system of claim 1, wherein the carrying apparatus further comprises at least one electrical connection unit, each electrical connection unit corresponds to one of the at least one circuit board and is electrically connected to the corresponding circuit board, each electrical connection unit passes through the seat.

3. The test system of claim 2, wherein the cover further comprises a plurality of sub-rib walls, the sub-rib walls are formed on the bottom surface of the base plate and are connected to the outer rib wall and the inner rib wall, the seat further comprises a plurality of sub-sealing grooves, the sub-sealing grooves are formed on the upper surface of the seat, each sub-sealing groove corresponds to one of the sub-rib walls and is configured to receive a respective third distal end of the corresponding sub-rib wall, the pressing apparatus further comprises a plurality of third sealing devices, each third sealing device corresponds to one of the sub-rib walls and is mounted on the corresponding sub-rib wall near the third distal end, the sealed auxiliary chamber are separated by the plurality of sub-rib walls into a plurality of sealed auxiliary sub-chambers, the plurality of auxiliary sub-chambers are respectively extracted through the at least one vent.

4. The test system of claim 2, wherein the pressing apparatus further comprises:
   a fourth sealing device, mounted on the first distal end of the enclosed outer rib wall; and
   a fifth sealing device, mounted on the second distal end of the enclosed inner rib wall.

5. The test system of claim 2, wherein the enclosed outer sealing groove and the enclosed inner sealing groove extend upwardly from the upper surface of the seat.

6. The test system of claim 2, wherein the enclosed outer sealing groove and the enclosed inner sealing groove are recessed downwardly from the upper surface of the seat.

7. A test system for testing a plurality of semiconductor devices, comprising:
   a pressing apparatus, comprising:
   a cover, comprising a base plate, an enclosed outer rib wall and an enclosed inner rib wall, the base plate having a bottom surface, the enclosed outer rib wall and the enclosed inner rib wall being formed on the bottom surface of the base plate;
   a seat, having an upper surface and comprising an enclosed outer sealing groove and an enclosed inner sealing groove, the enclosed outer sealing groove and the enclosed inner sealing groove being formed on the upper surface of the seat, the enclosed outer sealing groove being configured to receive a first distal end of the enclosed outer rib wall, the enclosed inner sealing groove being configured to receive a second distal end of the enclosed inner rib wall;
   a first sealing device, mounted on the enclosed outer rib wall near the first distal end; and
   a second sealing device, mounted on the enclosed inner rib wall near the second distal end, when the first distal end of the enclosed outer rib wall is inserted into the enclosed outer sealing groove and the second distal end of the enclosed inner rib wall is inserted into the enclosed inner sealing groove, the base plate, the enclosed inner rib wall and the seat constituting a sealed auxiliary chamber, the auxiliary chamber having at least one extraction hole, the first sealing device is pressed between the enclosed outer rib wall and the enclosed outer sealing groove, the base plate, the enclosed outer rib wall, the enclosed inner rib wall and the seat constituting a test chamber, the test chamber having at least one vent, the test chamber communicating with an exterior of said test system through the at least one vent, the second sealing device being pressed between the enclosed inner rib wall and the enclosed inner sealing groove;
   a carrying apparatus, disposed within the test chamber, the carrying apparatus comprising:
   at least one circuit board, disposed on the upper surface of the seat; and
   a plurality of test sockets, each test socket corresponding to one of the at least one circuit board and being electrically connected to the corresponding circuit board, each semiconductor device being carried by one of the test sockets; and
   an abutting apparatus, disposed between the bottom surface of the cover and the test sockets,
   wherein the auxiliary chamber is extracted through the at least one extraction hole, such that an air pressure in the auxiliary chamber is lowered to actuate the cover toward the seat and further to apply a force to the abutting apparatus, and such that the abutting apparatus presses against the plurality of semiconductor devices and the plurality of test sockets to allow each test socket to electrically contact with the semiconductor device carried by said one test socket.

8. The test system of claim 7, wherein the carrying apparatus further comprises at least one electrical connection unit, each electrical connection unit corresponds to one of the at least one circuit board and is electrically connected to the corresponding circuit board, each electrical connection unit passes through the seat, the pressing apparatus further comprises:
   a third sealing device, mounted on the first distal end of the enclosed outer rib wall; and
   a fourth sealing device, mounted on the second distal end of the enclosed inner rib wall.

9. The test system of claim 7, wherein the enclosed outer sealing groove and the enclosed inner sealing groove extend upwardly from the upper surface of the seat.

10. The test system of claim 7, wherein the enclosed outer sealing groove and the enclosed inner sealing groove are recessed downwardly from the upper surface of the seat.

* * * * *